Aug. 31, 1965    S. G. PETTERSSON    3,203,127
DIAPOSITIVE MOUNTS
Filed Feb. 11, 1963
Fig. 1.
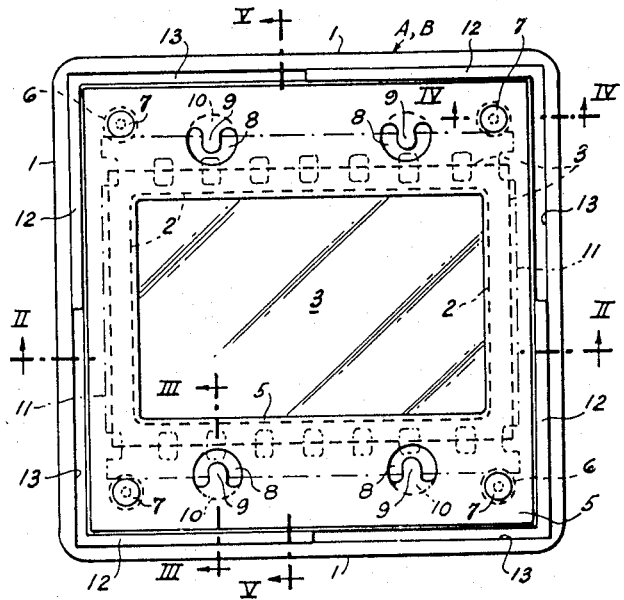
Fig. 2.
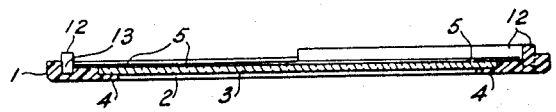
Fig. 3.    Fig. 4.
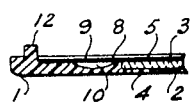    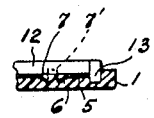
Fig. 5.
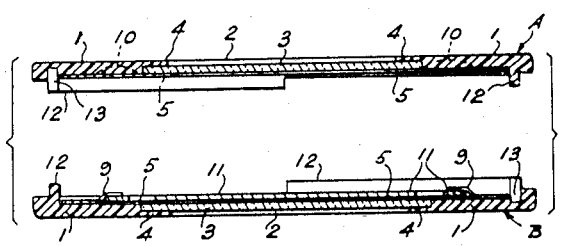
INVENTOR
SVEN GORAN PETTERSSON
BY
ATTORNEY

United States Patent Office 3,203,127
Patented Aug. 31, 1965

3,203,127
DIAPOSITIVE MOUNTS
Sven Göran Pettersson, Virebergsvagen 15, Solna, Sweden
Filed Feb. 11, 1963, Ser. No. 257,565
Claims priority, application Sweden, Feb. 23, 1962, 2,014/62
3 Claims. (Cl. 40—152)

This invention relates to protective mounts or frames for photographic film diapositives or similar unframed transparencies to be used in projectors. In assembled condition and with a transparency included the mounts or frames concerned are also frequently called "slides."

More particularly the invention is concerned with that kind of diapositive mounts or frames which comprises two main components or halves adapted to be placed on opposite sides of the transparency and each including a frame portion made of plastic and surrounding a protective glass pane.

One object of the invention is to provide an improved mount or frame of the type referred to, which is particularly adapted for rapid and cheap production, preferably in automatic molding and component assembling machines. Another object of the invention is to provide an improved diapositive mount or frame which may, when assembled, readily be taken apart repeatedly for changing the film transparency contained therein without any risk of damaging the mount components or the transparencies, and which is capable of reliably protecting the enclosed transparency from dust and dirt without requiring the use of adhesive materials to bind the two components together. Still another object of the invention is to provide improved means for adjustably locating and retaining the transparency between the two mount or frame components in a manner to prevent the occurrence or Newton-rings or other disturbances during projection and to secure a certain freedom as far as the possibilities to adjust the image of the transparency relative to the lightpassing opening of the mount is concerned.

According to the invention the two components of each mount or frame are substantially identical in shape and structure but, preferably, differently colored, so that they may both be produced in one and the same mold and assembly line, if so desired, and furthermore the components are adapted to be held together in assembled condition by frictional engagement between mutually cooperative projections and recesses on the inner faces of the two frame portions, so that they may readily be taken apart for changing or repositioning the transparency contained therein. It is an outstanding feature of such a mount or frame according to the invention that said projections and recesses are formed as ridges and grooves alternately following each other in close order along a line or row extending entirely around each frame portion slightly inside the outer contour thereof and outside the glass pane related thereto, said ridges and grooves forming, upon assembly of the two mount components, a continuous labyrinth seal encircling the transparency located between the glass panes.

The mount components or halves preferably present a substantially square outer contour and a rectangular light opening, said ridges and grooves being then arranged in such order that registration between the engaging ridges and grooves of the two components may be obtained irrespective of whether the longitudinal axes of the openings of the respective frame portions coincide or cross each other at a right angle.

Further features and advantages of the invention will appear from the following detailed description of a preferred embodiment thereof which has been illustrated in the accompanying drawing, wherein FIG. 1 is a plan view showing the inside of a mount component or half,
FIG. 2 is a section taken along line II—II in FIG. 1,
FIG. 3 is a section taken along line III—III in FIG. 1,
FIG. 4 is a partial section taken along line IV—IV in FIG. 1 and
FIG. 5 is a so called exploded cross section of both the two components of the complete mount taken along line V—V in FIG. 1 and showing how the film transparency is positioned between said two components.

The mount or frame illustrated in the drawing consists, as will be understood particularly from FIG. 5, of two structurally identical components or halves A and B respectively, which are preferably distinguished from each other by color or markings making it easy to properly position the completed slide when the latter is supplied to the projector. Each such component or half has the appearance shown in FIGS. 1–4 and comprises a substantially square frame portion 1 made of opaque plastic (synthetic resin) and presenting a central opening 2. This opening, which is slightly larger than the effective light opening as will appear from the following, has the conventional rectangular shape, and around the opening there is provided a recessed seat for a protective glass pane 3. This glass pane 3 is also rectangular and dimensioned to closely fit the seat so as to rest against a thin flange 4 extending around the opening 2 in plane with the outside of the frame portion 1.

The protective glass pane 3 is retained in its related frame portion 1 by means of a thin, frame-shaped metal sheet 5, the inner margin of which overlaps the glass pane and the inner edge of which extends slightly inside the inner edge of the flange 4 in order to form a so called mask which distinctly bounds and slightly reduces the effective light opening of the mount. The inner edge portion of the thin metal sheet 5 that will consequently become exposed as a narrow mat or border around the image when viewed through opening 2 of each frame portion 1 gives the completed slide or mount a very attractive appearance. However, the object of the thin metal sheet 5, which could preferably be of aluminum, is not only to serve as a mask but also to effectively prevent the film transparency 11 enclosed in the mount from touching the protective glass panes of the two frame portions to thereby avoid so-called Newton's rings and similar iridescences during projection of the image and make the use of sandblasted, etched or otherwise specially treated glass panes entirely superfluous.

The thin metal sheet 5 is secured to its related frame portion 1 already in the manufacturing plant in the manner that there is provided on the inside of the frame portion 1 near each corner of the thin metal sheet a small, preferably circular recess 6 of moderate depth from the bottom of which projects a small plastic pin or stud 7' formed integrally with the frame portion 1 proper, see FIG. 4. The thin metal sheet 5 is in turn provided with holes corresponding to said studs 7' and each such hole is located in a small depression corresponding in shape to said recesses 6. When the glass pane 3 has been properly seated against the flange 4 in the frame portion 1 the thin metal sheet is positioned above it in a manner to let the studs 7' project through said holes in the sheet, whereupon the studs 7' are deformed or "riveted" by means of a suitable, heated tool to form flared-out heads or buttons 7, which substantially fill out the depressions in the sheet 5. Of course, those buttons 7 must not project over the plane of the sheet 5 and thus interfere with the film transparency 11 to be placed thereon. If desired the depressions around the stud holes in the metal sheet 5 may be formed when the sheet is positioned and pressed against the frame portion.

On either one of the longitudinal sides of the central opening of the thin metal sheet 5 there are cut out horseshoe-shaped apertures 8 enclosing tabs or tongues 9 directed towards the central opening. Preferably, these tabs 9 are lying flush with the sheet 5 and, if so, a small shallow recess 10 may be provided in the frame portion 1 under each aperture 8 so that the transparency 11 to be mounted can easily be inserted with its edge under the tabs 9. Of course, the tabs will thereby be slightly bent up over the edge of the transparency as illustrated in FIG. 5 since they are rather weak. In fact, the thickness of the thin metal sheet 5 is, preferably, not more than about 0.1 millimeter (0.004 inch). Alternatively, the tabs 9 may be punched and pressed out a little from the plane of sheet 5, in which case the apertures 8 as well as the recesses 10 may be dispensed with, if desired.

Near its outer contour and outside the thin metal sheet 5 each frame portion 1 presents a series of elevated ridges 12 and corresponding grooves 13 on its inner side, i.e. the side on which the transparency 11 is to be placed. These ridges and grooves are arranged in immediate and alternating sequence and in the embodiment shown there are along each side of the frame portion arranged one ridge 12 extending along half the length of the frame side and one groove 13 extending along the rest thereof. It should be understood, however, that the number of ridges and grooves along each such length may be varied within wide limits. The ridges 12 and grooves 13 are complementary and arranged in such a manner that each ridge will enter a groove and completely fit the same when two mount components or frame portions are put together with their inner sides facing each other, as illustrated in FIG. 5. In fact, the ridges and grooves will, in the embodiment shown, perfectly fit each other irrespective of whether the two square mount components or frame portions are so located relative to each other that the longitudinal axes of their light openings 2 coincide or cross each other perpendicularly in order to reduce the light opening of the complete mount or slide to a square shape. Such arrangement of the ridges 12 and grooves 13 is advantageous but, of course, not necessary.

The cooperative ridges and grooves have two different purposes, one of which is to secure a reliable interengagement of the two mount components A and B by pure friction, i.e. without the aid of adhesive or other jointing means, so that said components may readily be taken apart without damage, when so desired, but also be capable to remain properly assembled even during rather rough handling. The other purpose of the ridges 12 and grooves 13 is to form a kind of labyrinth seal all around the film transparency 11 enclosed between the two components A and B, which seal will effectively prevent dust and other impurities from penetrating the slide and spoil the image projected therefrom but still permit necessary exchange of air and moisture to keep the film transparency 11 in good condition. Furthermore, the ridges 12, of course, confine the field within which the transparency 11 is to be located, so that proper positioning of the latter is facilitated and the transparency is prevented from creeping out of the completed slide.

It should be noted that the ridges 12 and grooves 13 are located rather close to the outer edges of each frame portion 1 so that ample space inside them is left for a conventional diapositive film transparency. This fact results in a valuable freedom when the transparency is to be positioned in the mount, because the transparency may then easily be adjusted both longitudinally, transversally and angularly relative to the effective light opening of the mount to expose just the desired portion thereof to the passing light beam. In order to facilitate such adjustments the apertures 8 with the tabs 9 are so dimensioned and located that the transparency 11, when inserted with its longitudinal edges under the tabs 9, can be moved in the transverse direction of the opening 2 just so much that exposing of its perforated margin in said opening is prevented. When proper position of the transparency is obtained, the tabs 9 may be manually bent down over it to prevent unintentional displacements thereof, when the mount or slide is completed, i.e. when the second mount component A is placed over the first one B and pressed into engagement therewith.

I claim:

1. In a protective mount for a film transparency, the combination of two identical components to be placed on opposite sides of the transparency to be mounted, each of said components comprising a frame portion of plastic having a quadri-lateral opening with a recess along the edge of said opening at the inner side of the frame portion and a protective glass pane covering said opening and seating in said recess, said frame portion further having, on its inner side, ridges and grooves alternately following each other with the ends of each groove coinciding with the ends of the adjacent ridges to form a continuous pattern of said ridges and grooves along a line extending entirely around said frame portion slightly inside the outer contour thereof and outside said glass pane, said ridges and grooves of each frame portion being complementary so that, upon assembly of the two components, the ridges of each frame portion extend into the grooves of the other frame portion and form a continuous labyrinth seal encircling the space within which the transparency is to be positioned.

2. In a protective mount for a film transparency, the combination as in claim 1; wherein said outer contour of each frame portion is square and said opening covered by the glass pane is rectangular; and wherein said ridges and grooves are arranged identically along all sides of the frame portion so that registration between the ridges and grooves of the frame portions of the two components is obtained both when the longitudinal axes of the openings of the two components coincide and when said axes are perpendicular to each other.

3. In a protective mount for a film transparency, the combination as in claim 1; wherein the protective glass pane of each component is retained in said recess of its related from portion by means of a frame-shaped thin metal sheet lying against the inner face of said frame portion inside said line of ridges and grooves and having a plurality of spaced holes, said frame portion having, on its inner side, shallow recesses surrounding studs formed integrally with said plastic frame portion and projecting through said holes in said thin metal sheet, said studs being flared out above said sheet by thermoplastic deformation to form sheet retaining heads on said studs, said thin metal sheets having depressions around said holes and substantially conforming with said shallow recesses of the frame portion and housing said stud heads.

References Cited by the Examiner

UNITED STATES PATENTS

| 2,292,312 | 8/42 | Wittel | 40—152 |
| 2,571,764 | 10/51 | Rodger et al. | 40—158 |
| 2,752,712 | 7/56 | Hose et al. | 40—152 |
| 2,806,309 | 9/57 | Goldberg | 40—152 |
| 2,959,882 | 11/60 | Krull | 40—152 |
| 3,097,443 | 7/63 | Kellner | 40—152 |
| 3,150,457 | 9/64 | Thieme | 40—152 |

EUGENE R. CAPOZIO, *Primary Examiner.*
JEROME SCHNALL, *Examiner.*